United States Patent
Shimase

(10) Patent No.: US 7,845,234 B2
(45) Date of Patent: Dec. 7, 2010

(54) COMPACT TILT AND VIBRATION SENSOR AND METHOD FOR MANUFACTURING THE SAME

(75) Inventor: Teruo Shimase, Tokyo (JP)

(73) Assignee: G-Device Corporation, Tokyo (JP)

( * ) Notice: Subject to any disclaimer, the term of this patent is extended or adjusted under 35 U.S.C. 154(b) by 463 days.

(21) Appl. No.: 12/064,187

(22) PCT Filed: Aug. 17, 2006

(86) PCT No.: PCT/JP2006/317021

§ 371 (c)(1),
(2), (4) Date: Feb. 19, 2008

(87) PCT Pub. No.: WO2007/021039

PCT Pub. Date: Feb. 22, 2007

(65) Prior Publication Data

US 2009/0266168 A1    Oct. 29, 2009

(30) Foreign Application Priority Data

Aug. 17, 2005    (JP)    .............................. 2005-265998

(51) Int. Cl.
  *G01H 11/06*    (2006.01)
  *H01R 43/00*    (2006.01)
(52) U.S. Cl. ........................ 73/649; 73/514.01; 73/652; 29/825
(58) Field of Classification Search ................... 73/649, 73/514.01, 651, 652, 654, 658; 29/825
See application file for complete search history.

(56) References Cited

U.S. PATENT DOCUMENTS

| | | | | |
|---|---|---|---|---|
| 4,656,458 A | * | 4/1987 | Iwata | .......................... 340/669 |
| 5,153,566 A | * | 10/1992 | Yun | ............................ 340/689 |
| 5,408,457 A | * | 4/1995 | Fujino et al. | ................. 367/178 |
| 5,610,338 A | * | 3/1997 | Kato et al. | ..................... 73/652 |
| 5,780,741 A | * | 7/1998 | Raj | .......................... 73/514.08 |
| 5,837,951 A | * | 11/1998 | Kato et al. | ............ 200/61.45 R |
| 6,604,422 B2 | * | 8/2003 | Wei | .............................. 73/652 |
| 7,450,025 B2 | * | 11/2008 | Fong | ....................... 340/686.1 |

FOREIGN PATENT DOCUMENTS

JP            1012107            1/1989

(Continued)

*Primary Examiner*—J M Saint Surin
(74) *Attorney, Agent, or Firm*—McGlew and Tuttle, P.C.

(57) ABSTRACT

Provided are a tilted vibration sensor incorporating a plurality of electrodes and a conductive spherical body which is turned on and off by the moving displacement of the spherical body, and which may be remarkably reduced in size and may have high performance and high operating sensitivity, high durability, and high reliability; and a method of manufacturing the sensor. The case (1) of the sensor comprises a case body (5) formed of a non-conductive material having such excellent gas-barrier property and heat resistance that can stop the transmission of gases which affects on the on/off operation of the sensor due to the moving displacement of the conductive spherical body (4) and a cover body (7) sealing airtight the opening part (6) of the case body. In the method of manufacturing the vibration sensor, moisture and particulate impurities affecting the on/off operation are removed from the hollow part (2) of the case (1), and the hollow part is evacuated.

18 Claims, 6 Drawing Sheets

FOREIGN PATENT DOCUMENTS

| | | |
|---|---|---|
| JP | 06162896 | 6/1994 |
| JP | 07-176255 | 7/1995 |
| JP | 11195359 | 7/1999 |
| JP | 11281354 | 10/1999 |
| JP | 2000251596 | 9/2000 |
| JP | 2000310648 | 11/2000 |
| JP | 2001358241 | 12/2001 |
| JP | 2002083530 | 3/2002 |
| JP | 2002298712 | 10/2002 |
| JP | 2003234050 | 8/2003 |
| JP | 2004171797 | 6/2004 |
| JP | 2004172436 | 6/2004 |
| JP | 2004177388 | 6/2004 |
| JP | 2004311951 | 11/2004 |
| JP | 2005016965 | 1/2005 |
| JP | 2005212017 | 8/2005 |
| JP | 2005222743 | 8/2005 |
| WO | WO 97/32325 | 9/1997 |

* cited by examiner

COMPACT TILT AND VIBRATION SENSOR AND METHOD FOR MANUFACTURING THE SAME

TECHNICAL FIELD

The present invention relates to a compact tilt and vibration sensor, which has a plurality of electrodes arranged in a non-conductive case and a conductive sphere movably received in the non-conductive case so that a moving displacement of the sphere due to a tilt or a vibration of the case causes the sensor to be turned on/off to detect the tilt or the vibration.

BACKGROUND ART

Sensors of this type are widely used today to be incorporated in home appliances, electronic products, and other various products and devices to detect a tilt or a vibration of the products and devices instead of mercury sensors, which use mercury, a harmful substance, as a movable electrode, but recently, as the devices in which the sensors are used are continuously downsized and the demands to mount the sensors into high-tech electronics of a compact size, such as digital camera and cell phone, have drastically increased, the level of the market demand for more downsizing, higher property, higher reliability is increasingly growing.

As the tilt and vibration sensors of this type, those that have a sensor case and a plurality of elongated metal lead frames projected out of the sensor case have been conventionally used as disclosed in Japanese Patent Application Laid-Open Nos. 10-12107 and 11-195359 for example.

However, in the tilt and vibration sensors having metal lead frames, generally, because a plurality of metal electrode plates are arranged in a hollow portion of the case and a plurality of fasteners, such as metal connectors, are required for fixing the metal lead frames to the case, a significant downsizing of the outer dimension of the whole sensor is difficult to achieve, which makes it impossible to mount the sensor to a printed circuit board by automatic soldering that uses surface mount technology (SMT) as a high density packaging technology of compact electronic components, and the sensor had to be mounted to a printed circuit board using approaches such as a so-called lead through mounting in which a plurality of lead through holes are formed in a printed circuit board and the metal leads are individually inserted through the through holes to be soldered.

The downsizing of a tilt detecting sensor requires a downsizing of a sensor case, and as a result, a compact sensor has been proposed in which a case body and/or a lid is molded into a size as small as possible using a thermoplastic synthetic resin having a relatively high heat resistance, and joining terminals that can be directly soldered to a printed circuit board using surface mount technology are arranged to be projected out of a sensor case, and the sensor case has an outer dimension as an approximately 5 mm cube.

DISCLOSURE OF THE INVENTION

However, for a further downsizing of a sensor in response to the increased demands for mounting the sensor to high-tech electronic devices of a compact size, such as cell phones, a thickness of a case body and/or a lid of a sensor case is needed to be further decreased as compared to those of conventional sensors, and a diameter of the conductive sphere as a movable electrode that is received in the hollow portion, inside of the sensor case, and needed to be further decreased corresponding to the downsizing of the sensor case. In addition, the significant downsizing of the sensor should not cause any degradation of its property, motion sensitivity, durability, and reliability. To prevent such degradation, the following problems due to the downsizing of a sensor have to be overcome.

First, if the air with moisture may enter the hollow portion of a sensor case, the sensor is likely to be affected by the viscosity of the moisture, and the movement of the conductive sphere as a movable electrode gets slower, and also the sensor is likely to be affected by the viscosity of the moisture, which is attached to the surfaces of a fixed electrode and the sphere in the hollow portion, and the movement of the conductive sphere has hysteresis characteristics, which causes the motion sensitivity of the sensor to be degraded. This degradation is further increased when any impurities in the form of particles, such as fine dust, are present in the hollow portion. Second, in a reflow process of surface mounting operation that uses SMI, heating causes the flux as a binder in the solder paste formed on the printed circuit board by screen printing to be evaporated, and the resulting vapor or the volatile portion contains harmful gases, such as chlorine, which decompose the electrode and the sphere, thereby if such gases may enter the sensor hollow portion, the surfaces of the electrodes and the sphere are decomposed by the oxidative effect or fluxing action of the harmful gases, and the motion sensitivity of the sensor to be degraded, and moreover, the useful life of the sensor is reduced. Third, a temperature rise in the hollow portion of a sensor causes the temperature of the gases in the hollow portion to rise, which increases the potential risk of breakage of the sensor case due to the pressure of the gases in addition to the reduced thickness of the sensor case for downsizing. Fourth, the downsizing reduces the distance between the electrodes and the sphere, which in turn reduces the electrical insulation distance, thereby any attachment of moisture or impurities to the electrodes or other elements causes an insulation resistance to be considerably reduced, and an arc discharge that damages the electrodes to be easily generated, and the durability and performances of the sensor to be adversely affected. Fifth, because the volume of the hollow portion of the sensor case is considerably reduced, it is difficult to arrange electrode plates that are made of conductive metal plates such as copper plates and have a common property in the hollow portion. Sixth, if the sphere is charged with a static electricity, which is generated by the friction contact between the sphere of a metallic ball and the inner wall surface of the sensor case, which is an insulator, an attraction or repulsion arises therebetween, which may cause irregular motion of the sphere.

The present invention was made to solve the afore-mentioned problems arising out of the significant downsizing of a sensor case.

It is, therefore, a principal object of the present invention to provide a compact tilt and vibration sensor, which has a high performance, such as high motion sensitivity, a high durability and a high reliability, and a method for manufacturing the same.

Another object of the present invention is to provide a compact tilt and vibration sensor, which can be mass produced to be supplied at a reasonable price and enables a detection of a tilt or vibration in multi directions, and a method for manufacturing the same.

In order to achieve the above objects, a compact tilt and vibration sensor according to the present invention comprises: a case including a case body having a hollow portion that is open at the top thereof and a lid that hermetically seals the opening of the hollow portion; electrodes comprising at least four conductive coatings that are equally spaced adjacent to each other on a peripheral wall surface of the hollow portion; a planar electrode formed of one conductive coating that is disposed on a bottom surface of the hollow portion; and a conductive sphere that is movably received in the hollow portion and contacts two of the adjacent electrodes or one of the electrodes and the planer electrode to form an electrical contact point, and a tilting or vibration of the case causes the conductive sphere to move so that the sensor is turned on/off by the movement, and the case body and the lid are made of a nonconductive material having a high gas-barrier property and a high heat resistance, and any impurities, such as moisture and fine dust, which adversely affect the on/off operation of the sensor by the movement of the sphere are removed from the hollow portion, and the inside of the hollow portion is evacuated.

A compact tilt and vibration sensor according to the present invention is characterized in that it comprises: a case including a case body having a hollow portion that is open at the top thereof and a lid that hermetically seals the opening of the hollow portion; an electrode including at least four conductive coatings that are equally spaced adjacent to each other on a peripheral wall surface of the hollow portion; a planar electrode formed of one conductive coating that is disposed on a bottom surface of the hollow portion; and a conductive sphere that is movably received in the hollow portion and contacts with two of the adjacent electrodes or one of the electrodes and the planer electrode to form an electrical contact point, and a tilting or vibration of the case causes the conductive sphere to move so that the sensor is turned on/off by the movement, and the case body and the lid are made of a nonconductive material having a high gas-barrier property and a high heat resistance, and a gas having a high electrical insulation property is depressurized at least to a predetermined degree of vacuum and enclosed in the hollow portion.

The compact tilt and vibration sensor according to claim 1 or 2 of the present invention is also characterized in that the case body is a laminated structure that is made by hermetically bonding a plurality of rectangular sheets, the sheets being molded using the nonconductive material.

The compact tilt and vibration sensor according to claim 1 or 2 of the present invention is also characterized in that the case body is an integrally molded rectangular parallelepiped.

The compact tilt and vibration sensor according to claim 1 or 2 of the present invention is also characterized in that the hollow portion is formed as a square hole having a cross section of a generally square shape, and has four peripheral wall surfaces, which are individually provided with a conductive coating formed thereon as a separated electrode.

The compact tilt and vibration sensor according to claim 1 or 2 of the present invention is also characterized in that the nonconductive material is fine ceramics, glass, or the mixture thereof.

The compact tilt and vibration sensor according to claim 1 or 2 of the present invention is also characterized in that it further comprises flat connecting terminals, which are provided on a lower surface of the bottom of the case body, the terminal being formed of a conductive coating and individually and electrically connected to each of the electrodes.

The compact tilt and vibration sensor according to claim 1 or 2 of the present invention is also characterized in that the case body and the lid are bonded to each other using a sealing glass.

The compact tilt and vibration sensor according to claim 1 or 2 of the present invention is also characterized in that the conductive coating is formed as a thin film using a film deposition technique such as thin film deposition, coating, vacuum deposition, sputtering, and ion plating.

The compact tilt and vibration sensor according to claim 1 or 2 of the present invention is also characterized in that it has outer dimensions of from 2.5 mm×2.5 mm×2.0 mm to 1.5 mm×1.5 mm×1.0 mm.

A method for manufacturing a compact tilt and vibration sensor according to the present invention is characterized in that it comprises: a step of vertically and horizontally mounting a plurality of case bodies in a grid onto a nonconductive sheet having a gas barrier property and heat resistance, each of the case bodies being open at the top thereof and having a hollow portion therein where electrodes formed of a plurality of conductive coatings are arranged and flat connecting terminals formed of a plurality of conductive coatings on a lower surface of the bottom of the case body that are individually and electrically connected to the electrodes; a step of movably receiving conductive spheres that can be contacted with and separated from the electrodes into the hollow portions of the case bodies; a step of hermetically bonding a nonconductive cover sheet that has a gas barrier property and a heat resistance and forms a lid for hermetically seal the top opening of each hollow portion to an upper surface of the nonconductive sheet on which the plurality of case bodies are mounted; a step of removing moisture and particulate impurities, such as fine dust, which adversely affects the on/off operation by the movement of the sphere from the hollow portion of each case body, and also evacuating the hollow portion; and a step of cutting the cover sheet and the sheet in series along vertical and horizontal dicing lines provided on the cover sheet to obtain sensors as individual assemblies.

The method for manufacturing a compact tilt and vibration sensor according to the present invention is characterized in that the sheet for the case body and the cover sheet for the lid is made of ceramics, glass, or the mixture thereof, and the sheet for the case body is a laminated structure made by hermetically and vertically bonding a plurality of rectangular sheets that are molded using the material.

BEST MODE FOR CARRYING OUT THE INVENTION

Now, an embodiment of the present invention will be explained in detail below by way of the following examples.

Figure 1:
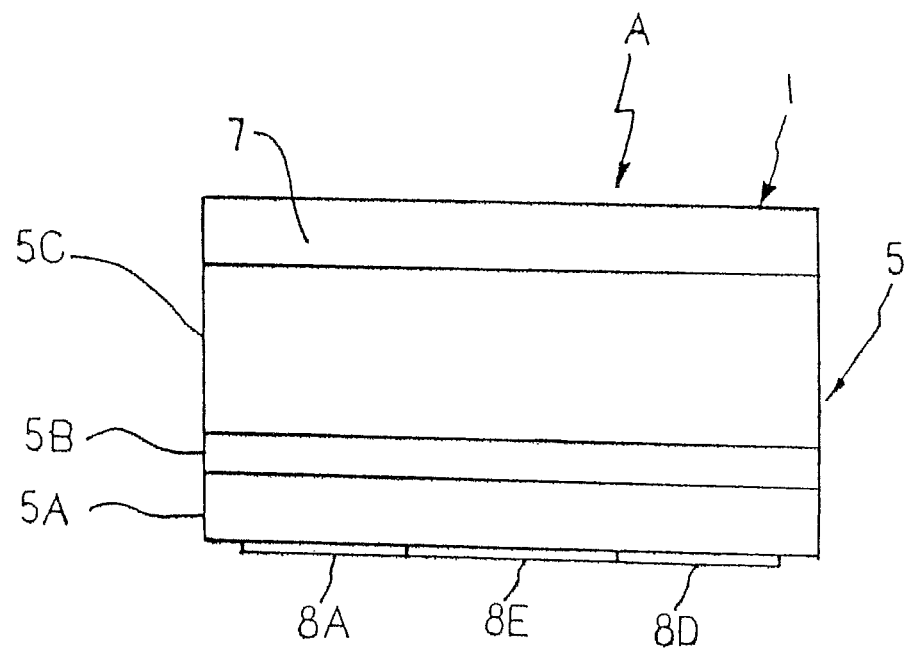
FIG. 1 is a front view of a tilt and vibration sensor as one embodiment of the present invention.
Figure 2:
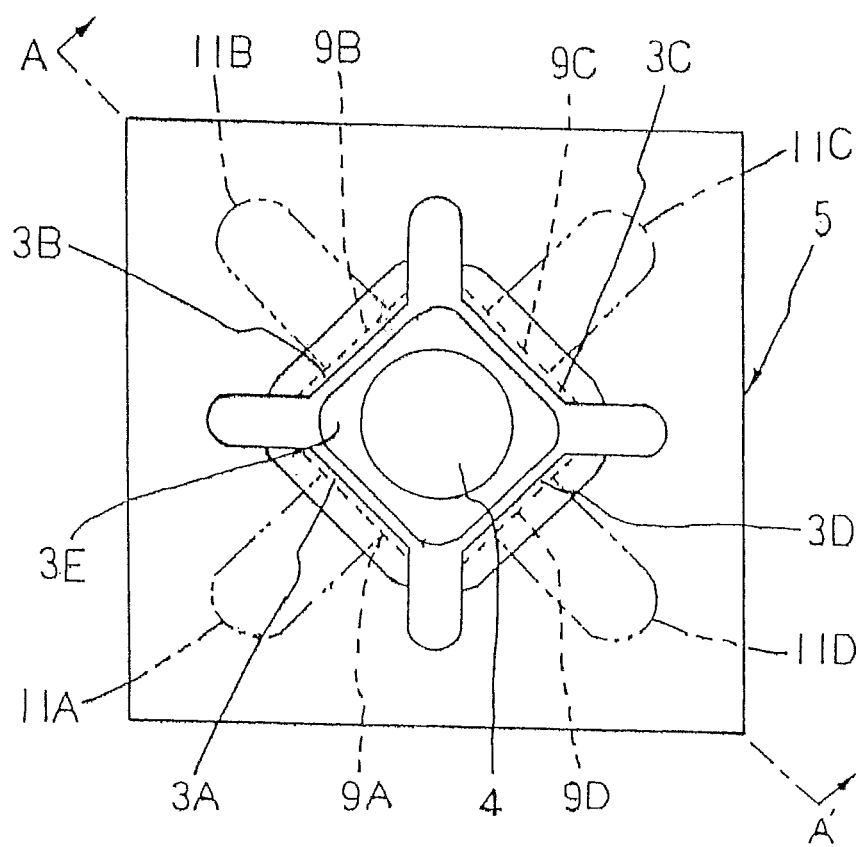
FIG. 2 is a plan view of a case body of the sensor.
Figure 3:
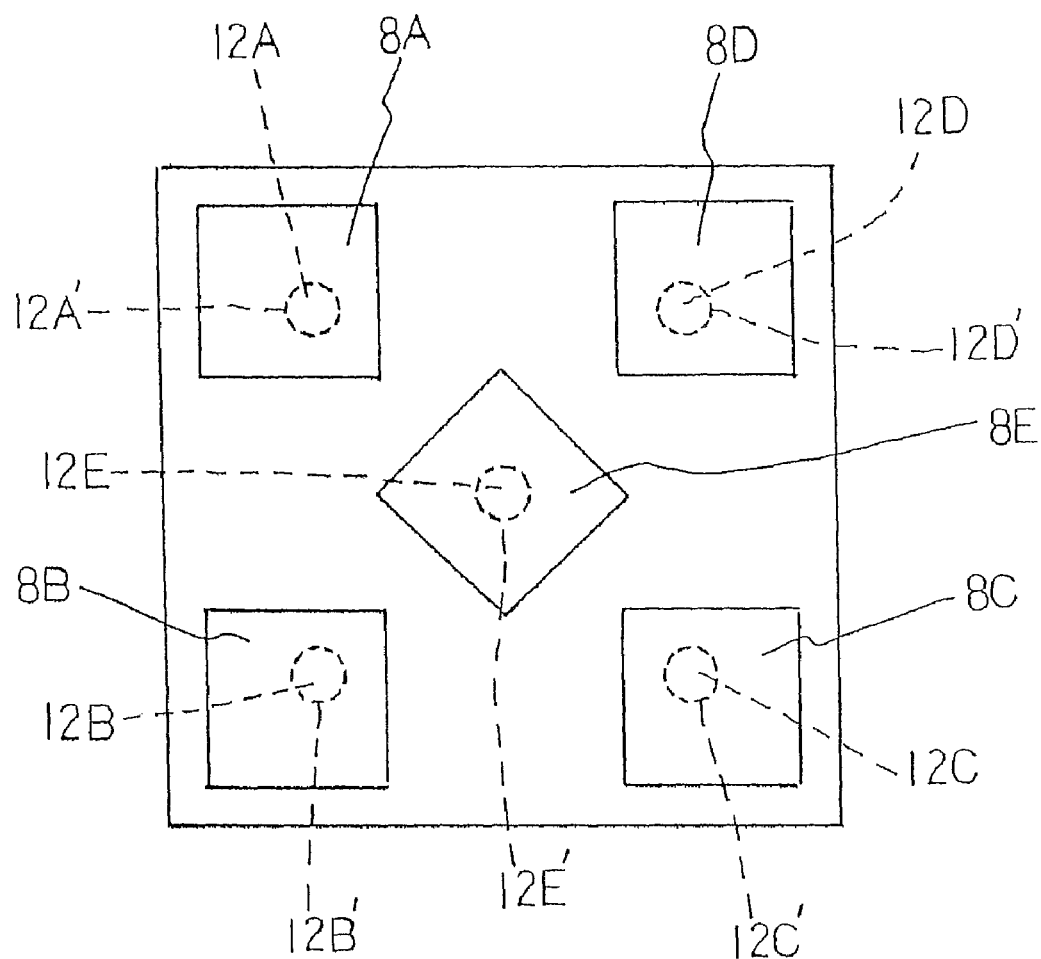
FIG. 3 is a bottom view of the sensor.
Figure 4:
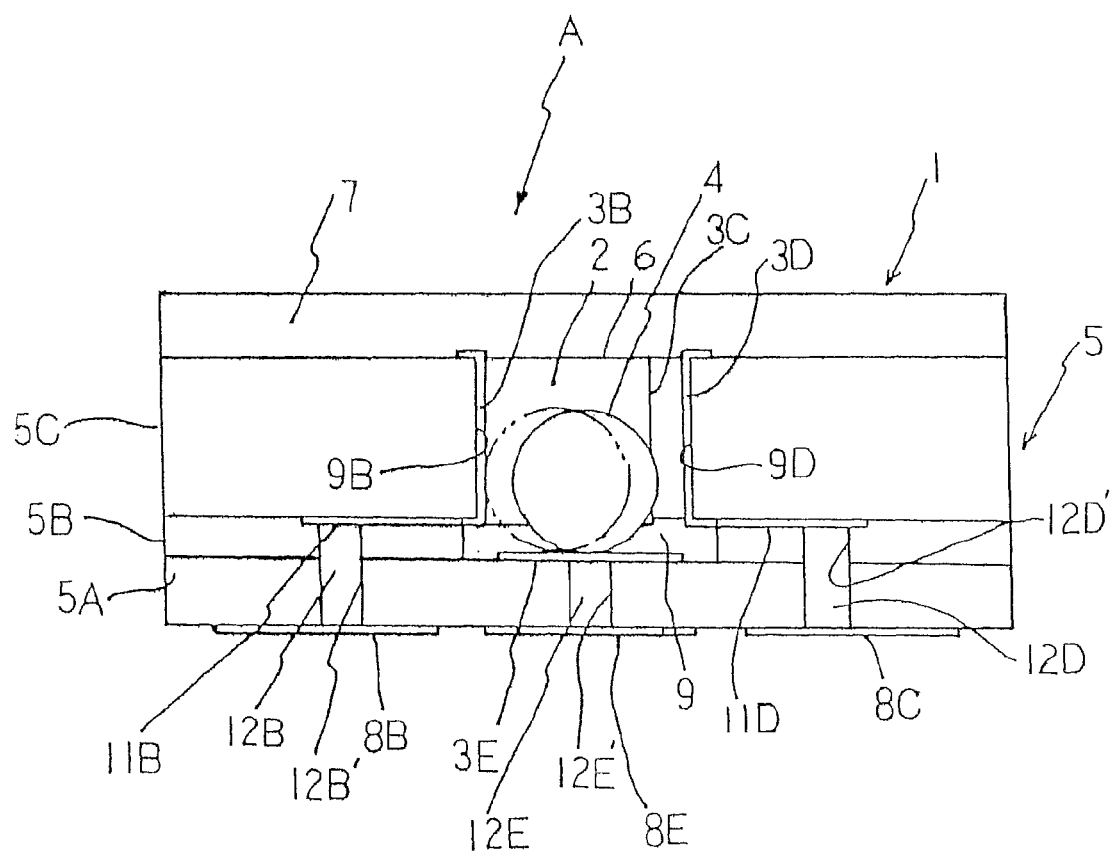
FIG. 4 is a vertical cross-sectional view of the taken along the line A-A' of FIG. 2 showing the case body with a lid.

FIGS. 1 to 4 show a tilt and vibration sensor A as one example of the present invention: FIG. 1 is a front view of the sensor; FIG. 2 is a plan view of a case body of the sensor; FIG. 3 is a bottom view of the sensor; and FIG. 4 is a vertical cross-sectional view taken along the line A-A' of FIG. 2 showing the sensor. In these drawings, the reference numeral 1 designates a non-conductive case of the sensor A, the reference numeral 2 designates a hollow portion of the case, the reference numerals 3A, 3B, 3C, 3D, and 3E designate electrodes, and the reference numeral 4 designates a conductive sphere, which is freely movably accommodated in the hollow portion.

The sensor case 1 includes a case body 5 that is formed of a non-conductive material such as fine ceramics having a high gas barrier property and a high heat resistance for blocking any gas transmission that adversely affects the on/off operation by the moving displacement or rolling of the sphere 4, and a sheet-form of lid 7 for hermetically sealing an opening 6 that is open at the center of the top surface of case body 5, and the four electrodes 3A, 3B, 3C and 3D are formed on the peripheral wall surfaces of the hollow portion 2 by electrically conductive coatings that are obtained by electrolytic deposition for example, and the electrodes are electrically connected to four flat connecting terminals 8A, 8B, 8C and 8D, which are conductive coatings formed on a lower surface of the bottom of the case body 5, respectively via conductive paths.

In the above example, the case body 5 is, as shown in FIG. 1 and FIG. 4, a three-layer laminated structure formed by vertically and hermetically bonding three square sheets formed of the non-conductive material 5A, 5B, and 5C using solid phase diffusion bonding in which a bonding material, such as a sealing glass having a low melting point, is bonded using an interfacial diffusion in its solid state under the melting point without heating the material to the melting point, and the laminated structure is provided with a hollow portion 2 that has a dimension to movably receive the conductive sphere 4 and has a cross section of a generally square shape, the hollow portion 2 including a square hole 9 that has a cross section of a generally square shape and vertically passes through the central part of the two sheets 5B and 5C except the sheet 5A that is the lowest layer forming the bottom of the structure, and the upper surface of the lowest layer sheet 5A, and the four peripheral wall surfaces of the hollow portion 2 are provided with the four electrodes 3A, 3B, 3C and 3D, which are three dimensionally formed as separate electrodes that are insulated from each other on the four peripheral walls 9A, 9B, 9C and 9D of the square hole, respectively, at the central part of the third layer from the bottom, that is, the uppermost layer sheet 5C. When the sheet material is ceramics, each of the square holes 9 of the sheets 5B and 5C is punched through the sheets before the sheets are fired. In the above example, among the sheets 5A to 5C of the laminated structure, the sheet 5C as the uppermost sheet has the maximum thickness. The number of sheets and the thickness and size of the sheets may be adjusted depending on the application of the sensor. On the upper surface of the lowest layer sheet 5A, which is on the bottom surface of the hollow portion 2, a single planar electrode 3E formed of a conductive coating is provided separately from the other electrodes in the hole 9 at the central part of the sheet 5B, which is the second layer from the bottom, the hole 9 at the central part of the sheet 5B being slightly larger than that at the central part of the sheet 5C. In the example shown, the electrodes 3A, 3B, and 3D are configured to function as negative electrodes, and the electrode 3E is configured to function as a positive electrode.

In the above example, in the case body 5 having the three-layer laminated structure, metal films 11A, 11B, 11C, and 11D are formed on the lower surface of the uppermost sheet 5C as first conductive paths connected to the four conductive coatings 3A, 3B, 3C, and 3D, which function as separate electrodes, respectively (see FIGS. 2 and 4), and also conductors 12A, 12B, 12C, and 12D are filled in the through holes 12A', 12B', 12C', and 12D' that vertically pass through the two laminated sheets 5A and 5B that are the first and second sheets from the bottom, the conductors 12A, 12B, 12C, and 12D having ends that are connected to the four metal films 11A, 11B, 11C, and 11D to form second conductive paths, and the other ends that are connected to the connecting terminals 8A, 8B, 8C, and 8D, which can be directly soldered to a printed circuit board. The electrode 3E on the bottom surface of the hollow portion is electrically connected to a flat connecting terminal 8E formed of a conductive coating on the lower surface of the sheet 5A via the conductor 12E filled in the through hole 12E' at the central part of the lowest sheet 5A as a conductive path. Both of the metal films 11A to 11D and the connecting terminal 8A to 8E are formed by electrolytic deposition, similar to the electrodes 3A to 3D.

To the upper surface of the case body 5, which is configured as described above, in order to hermetically seal the opening 6 after the sphere 4 is received in the hollow portion 2, a sheet-like lid 7 is hermetically bonded using a sealing glass having a low melting point such as flit glass that does not transmit gases for example, and in the sealing step, moisture and particulate impurities such as fine dust, which adversely affect the on/off operation of the sensor from the inside of the sensor case 1, which is formed by the bonding of the case body 5 and the lid 7, which is the hollow portion 2, and also the hollow portion is evacuated, or a gas having a high electrical insulation property including one of a dried air, nitrogen gas, helium, argon, xenon, and sulfur hexafluoride, or the mixture thereof is depressurized at least to a predetermined degree of vacuum, for example one tenth atmospheric pressure, and enclosed in the hollow portion. The evacuation of the hollow portion 2 or enclosure of a depressurized air into the hollow portion 2 can be achieved using a multi-atmosphere vacuum heat treating furnace, which has a vacuum replacement function for a higher purity of a gas to be introduced and a number of atmosphere gases can be introduced therein.

When the sensor case 1 is made of ceramics, a ceramics such as $Al_2O_3$, which has a high insulating property and a low coefficient of thermal expansion, or a glass ceramic (LTCC) having a firing temperature of 90 degrees C. or less, is desirably used. The examples of the material for forming the sensor case 1 may include any nonconductive materials other than ceramics that have a high heat resistance and a gas barrier property, such as a glass with a low coefficient of thermal expansion like quartz glass, borosilicate glass, phosphor-silicate glass, or a mixture of one of the glass material and ceramics.

The above electrodes and connecting terminals may be formed using a film deposition technique such as thin film deposition, coating, vacuum deposition, and sputtering, as well as electrolytic deposition. And the examples of the material used in the deposition include highly conductive pure rhodium, rhodium-combined platinum, ruthenium-combined hard platinum, pure platinum, hard palladium, hard gold alloy, such as cobalt-combined hard gold, other hard gold or the like and nickel. Among the above materials, nickel is desirably used in the undercoating, which is useful for reinforcing the coating.

The conductive sphere 4 as a movable electrode having a smaller diameter has a smaller mass, and so in order to obtain a good mobility of the sphere 4 and a good contact between the sphere 4 and the electrodes 3A to 3E, it is desirable to use a sphere made of a material having a greater specific gravity, such as a tungsten sphere, a stainless sphere, and a steel sphere, and it is also desirable to coat nickel as an undercoating on the surface and then deposit gold, for example, which has a high conductivity over the undercoating as a finish. With a little more costs, however, hard gold alloy, such as cobalt-combined hard gold or other hard gold is preferably be used to form the conductive sphere.

The case body and/or lid may be formed by injection molding or high temperature compression and sintering molding using an improved engineering plastic or super engineering plastic as a base material having a excellent physical property to enable a block of transmission of outgas and the like. The examples may include PBI and nylon based alloy.

The sensor case 1 may be configured with a case body and a sheet-like lid for hermetically sealing the opening at the central portion of the top of the case body, which are individually integrally formed of a nonconductive material, such as ceramics like $Al_2O_3$, having a high gas barrier property and heat resistance to enable a block of transmission of gases that adversely affect the on/off operation by the moving displacement of the sphere as in the above example.

FIGS. 6A to 6D show an example of a method for manufacturing a tilt and vibration sensor according to the present invention. Reference character X indicates a square-shaped laminated structure which is formed with one hundred case bodies 5 within a grid, with the laminated structure being formed by hermetically bonding three square ceramics sheets 5A', 5B' and 5C' together using a bonding material, such as a sealing glass, where after a conductive sphere 4 is received in a hollow portion 2 of each case body 5 in which a plurality of electrodes 3A to 3E are provided, a non-conductive cover sheet Y as a lid 7 is hermetically bonded to the upper surface of the laminated structure X using a bonding material, such as a sealing glass, to hermetically seal the upper surface opening 6 of each hollow portions. In the sealing step, moisture and particulate impurities, such as fine dust, which adversely affects the on/off operation by the movement of the sphere are removed from the hollow portion of each sensor case, and also the hollow portion is evacuated, or a gas having a high electrical insulation property is depressurized at least to a predetermined degree of vacuum is enclosed in the hollow portion. After this step, the laminated structure formed of the laminated sheets X and the cover sheet Y is serially cut along the dicing lines S and S', which are crisscrossed on the cover sheet Y, so that sensors can be obtained as individual assemblies. In FIGS. 6A to 6D, for avoiding complexity, connecting terminals and conductive paths are omitted. In the example, the laminated structure is configured so that a hundred of sensors having outer dimensions of a height of 2.0 mm, a length of 2.5 mm, and a width of 2.5 mm are obtained, but it is easy to provide such a structure, which is configured to obtain more sensors, for example nine hundred of sensors. Therefore, the sensor according to the present invention can be mass produced to be supplied at a low price.

Next, the operation of the tilt and vibration sensor A described above as an example of the present invention will be explained below.

When the sensor tilts forward, backward, to the left, or to the right, the conductive sphere 4 rolls in the direction of the tilt of the sensor A on the electrode 3E on the bottom surface of the hollow portion to contact two of the adjacent electrodes among the four electrodes 3A, 3B, 3C, and 3D, so that the two electrodes and the electrode 3E are electrically coupled with each other, which achieves a state in which three points are in contact with each other and turn on the sensor, and one direction is detected.

Figure 5:
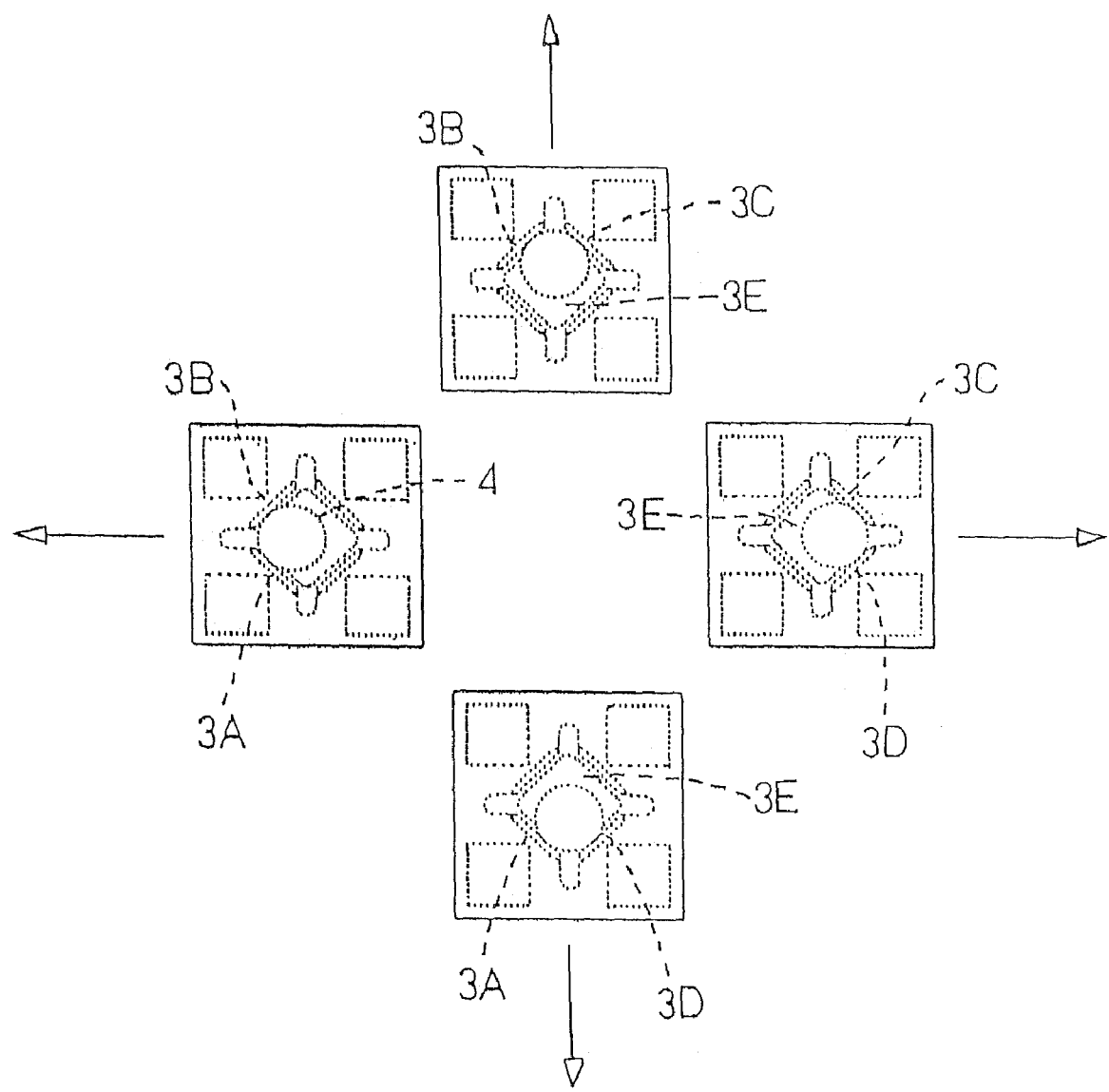
FIG. 5 is a plan view illustrating the operational aspects of the sensor.
Figure 6A:
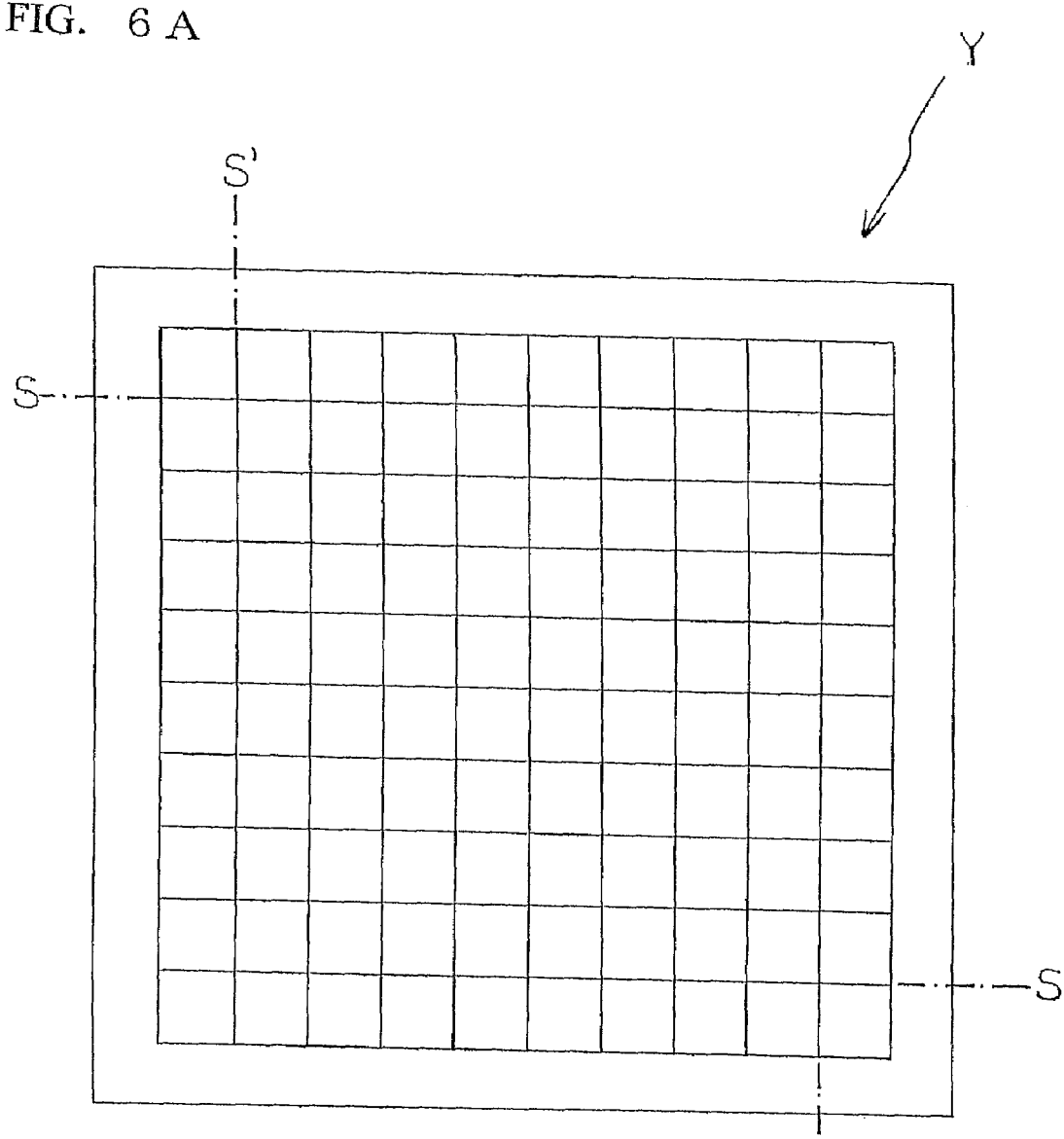
FIG. 6A is a schematic plan view showing one example of a laminated structure in a square form in which a plurality of tilt and vibration sensors of the invention are assembled.
Figure 6B:
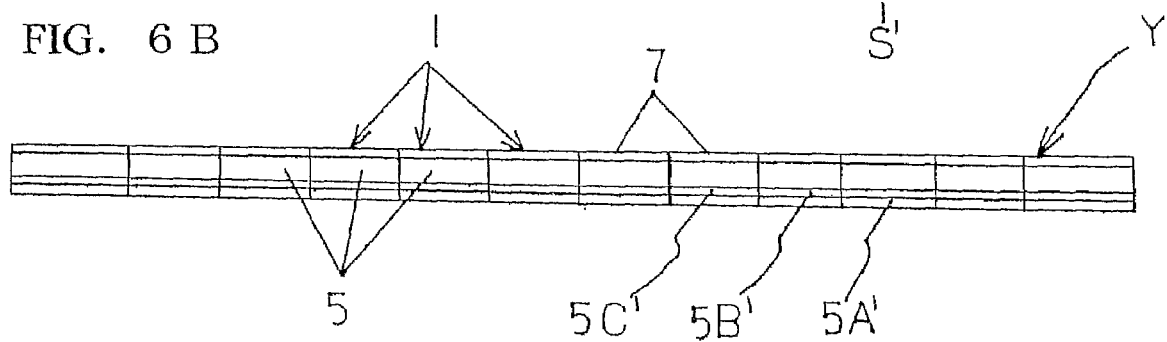
FIG. 6B is an enlarged side view of the laminated structure shown in FIG. 6A.
Figure 6C:
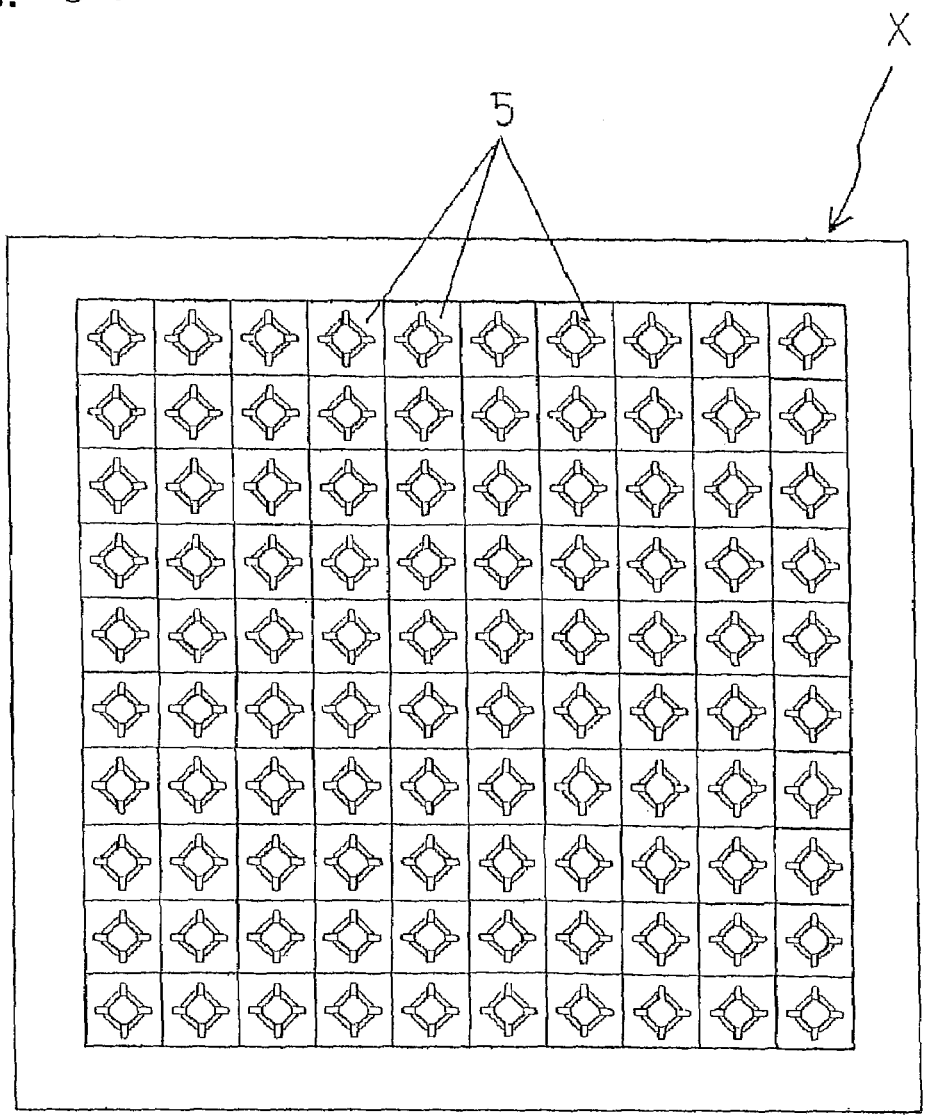
FIG. 6C is a plan view showing the laminated structure of FIG. 6A without a cover sheet as a lid and a conductive sphere.
Figure 6D:
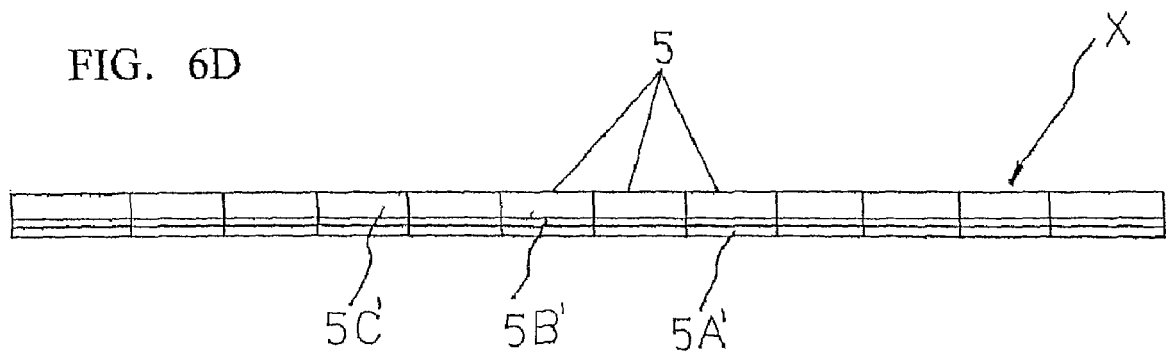
FIG. 6D is an enlarged side view showing the laminated structure of FIG. 6C.

That is, in FIG. 5, when the sensor A tilts to the lower left direction, the sphere 4 rolls to the left as shown by an arrow to contact the two electrodes 3A and 3B so that the two electrodes and the electrode 3E are electrically coupled with each other to make the sensor turn on. The turned-on state enables a detection of the tilt to the left direction by the sensor A. Conversely, when the sensor A tilts to the lower right direction, the sphere 4 rolls to the right as shown by an arrow to contact the two electrodes 3C and 3D, so that the two electrodes and the electrode 3E are electrically coupled with each other to make the sensor turn on. The turned-on state enables a detection of the tilt to the right direction by the sensor A.

Next, when the sensor A tilts to the anteroinferior direction, the sphere 4 rolls forward as shown by an arrow to contact the two electrodes 3A and 3D, so that the two electrodes and the electrode 3E are electrically coupled with each other to make the sensor turn on. The turned-on state enables a detection of the forward tilt by the sensor A. Conversely, when the sensor A tilts to the posterior inferior direction, the sphere 4 rolls backward as shown by an arrow to contact the two electrodes 3B and 3C, so that the two electrodes and the electrode 3E are electrically coupled with each other to make the sensor turn on. The turned-on state enables a detection of the backward tilt by the sensor A. In this way, contacted three points at the corners of the square hole enable a detection of the direction of a tilt in a more stable and reliable manner.

When the sensor A tilts in the middle of the lower left direction and the posterior inferior direction, in the middle of the lower right direction and the anteroinferior direction, or in the middle of the lower right direction and the posterior inferior direction, the sphere 5 rolls to the said middle direction on the electrode 3E to contact the electrode 3A, 3B, 3C, or 3D to achieve a state in which two points are in contact, and in this case, the two points in contact make the electrodes to be electrically interconnected to turn on the sensor, so that the direction can be detected.

In this way, the sensor of the present invention in which both of the three-point contact and the two-point contact are achieved as described above can be used as a sensor for detecting eight directions when the sensor is used in a manner to detect one direction in one three-point contacted state at the corners of the square hole, and one direction in one two-point contacted state in which the electrode 3E is in contact with one of the electrode films on the wall surfaces via the sphere 4.

Next, when the sensor A is vibrated, whether the vibration occurs in a horizontal direction, an anterior-posterior direction, a vertical direction, or other direction, as long as the vibration continues, the sphere 4 is repeatedly displaced to contact with and be separated from the two adjoining electrodes among the electrodes 3A, 3B, 3C, and 3D or one of the electrodes and the electrode 3E, to turn on/off the sensor. The repetition of the turned on/off state enables a detection of a vibration by the sensor A.

In the tilt and vibration sensor A, as described above, since the sensor case 1 is formed of a non-conductive material having a high gas barrier property and a high heat resistance to enable a block of transmission of gases that adversely affect the on/off operation by the rolling of the sphere 4, and also the inside moisture and impurities are removed and the inside portion is evacuated, or a gas having a high electrical insulation property is depressurized at least to a predetermined degree of vacuum and enclosed in the inside portion, a significant downsizing of the outer dimensions (for example, the sensor case 1 is formed as a ultra compact 2 mm cube) does not allow any entry of moisture or harmful gases to the inside portion, that is the hollow portion, and the sphere 4 moves quickly and smoothly when the sensor tilts, which enables a detection of a tilt or vibration at a constantly high motion sensitivity, and achieves a longer useful life.

In the example, the sensor is configured to have four electrode films on the peripheral walls of the hollow portion and a common electrode 3E on the bottom, but as one modified example, the sensor may be configured to include a hollow portion, which has a cross section of a hexagon or octagon shape and electrode films are formed on each peripheral wall of the hollow portion. In either case, no conventional elongated metal lead frames or metal leads and fasteners for them are eliminated, which allows the sensor to have a simple configuration, and also enables a mass production of significantly downsized sensors.

In the above described example, the electrode 3E on the bottom surface of the hollow portion 2 functions as a common electrode film, and also as means for preventing or removing static electricity charge of the conductive sphere 4, which is a metallic ball.

That is, since static electricity is sometimes generated in the sensor for some reason, in another modified example, the electrode 3E may be used as means for preventing or removing static electricity charge of the sphere 4, not as a common electrode film, so that any accumulation of electricity in the sensor can be prevented.

Furthermore, if the above configuration is still insufficient, an electrode similar to the bottom electrode film 3E may be provided to the back surface of the lid 7.

The case body 5 may be formed of ceramics or glass, and the lid may be formed of glass so that motion of the sphere 4 in the hollow portion 2 can be easily checked with eyes.

INDUSTRIAL APPLICABILITY

According to the present invention, a tilt and vibration sensor can be obtained that enables a significant downsizing, and also in spite of the significant downsizing, has a high property or motion sensitivity, a durability, and a high reliability. Therefore, according to the present invention, a ultra compact sensor, which is preferably used in high-tech electronic devices of a compact size can be provided so that the sensor can be used not only to be incorporated in general home appliances and electronic devices to detect a tilt or a vibration of the products and devices, but also as a switch that scrolls a screen when a cell phone is tilted, or a sensor that automatically corrects the longitudinal and lateral direction of an image depending on the direction of a digital camera.

In addition, a tilt and vibration sensor provided by the present invention can be mounted to a printed circuit board surface by an automatic soldering using surface mount technology (SMT) in which a chip mounter can be used, similar to a compact electronics, such as condenser and resistor that are generally called as chip, thereby the sensor can considerably contribute to improve the productivity of the devices to be used.

According to the present invention, a tilt and vibration sensor can be obtained that enables a significant downsizing, and has a high property or motion sensitivity, a durability, and a high reliability.

According to the present invention, a tilt and vibration sensor can be obtained that can be mass produced to be supplied at a reasonable cost, and enables a detection of a tilt and vibration in all directions.

The invention claimed is:

1. A compact tilt and vibration sensor comprising:
a case comprised of a case body having a hollow portion that is open at the top thereof and a lid that hermetically seals the opening of said hollow portion, a plurality of three-dimensional electrodes formed of at least four electrically conductive coatings that are arranged in equally spaced relationship with each other on inner peripheral wall surfaces of said hollow portion and a conductive metal sphere that is freely movably received in said hollow portion and comes into contact with two adjoining electrodes of said electrodes to electrically interconnect both of the two adjoining electrodes, said case body being formed of a laminated structure constituted by vertically laminating a plurality of sheets that are individually made from ceramics containing a predetermined amount of low thermal expansion glass, and are co fired at a low temperature, wherein when said case is tilted or vibrated, said conductive metal sphere is caused to move in said hollow portion so that the sensor is turned on/off by the moving displacement thereof, wherein:
the conductive metal sphere comprises a spherical body without plating that is formed from hard gold alloy;
the lid is formed of a low thermal expansion glass having a high gas-barrier property and a high heat resistance so that a motion of the conductive metal sphere in the hollow portion of said case body may be checked from the outside of said case through the glass lid with eyes;
planar conductive coatings are formed on a bottom surface of the hollow portion of the case body and a lower surface of the lid as means for preventing and/or removing a static electricity charge of the conductive metal sphere;
any impurities, such as moisture and fine dust, which adversely affect the on/off operation by the moving displacement of the conductive sphere, are removed from the hollow portion; and
a gas having a high electrical insulation property is included in said hollow portion under the state in which it is depressurized at least to a predetermined degree of vacuum.

2. The compact tilt and vibration sensor according to claim 1, wherein the conductive coating disposed on the bottom surface of the hollow portion of the case body is configured to be able to function as a common electrode.

3. The compact tilt and vibration sensor according to claim 1, wherein the case body is a rectangular parallel pipe that is integrally formed of a super engineering plastic as a base material having high heat resistance without heat distortion in a reflow process in STM (surface mount technology) and an excellent gas barrier property that enables blocking the transmission of moisture, outgas, and the like, instead of the ceramics or the low temperature expansion glass, by injection molding or high temperature compression and sintering molding.

4. The compact tilt and vibration sensor according to claim 1, wherein the hollow portion is formed as a square hole having a cross section of a generally square shape, and has four peripheral wall surfaces that are individually provided with a conductive coating formed thereon as separated electrode.

5. The compact tilt and vibration sensor according to claim 4, wherein the lid of the sensor case includes a plate shaped glass sheet.

6. The compact tilt and vibration sensor according to claim 1, further comprising flat connecting terminals provided on a lower surface of the bottom of the case body, the terminal being formed of a conductive coating and individually and electrically connected to each of the electrodes.

7. The compact tilt and vibration sensor according to claim 1, wherein the case body and the lid are bonded to each other using a sealing glass.

8. The compact tilt and vibration sensor according to claim 1, wherein the conductive coating is formed as a thin film using a film deposition technique, such as thin film deposition, coating, vacuum deposition, sputtering, and ion plating.

9. The compact tilt and vibration sensor according to claim 1, wherein the sensor has outer dimensions that allow an application of surface mount technology for a printed circuit board using a chip mounter.

10. A compact tilt and vibration sensor comprising:
a case comprised of a case body having a hollow portion that is open at the top thereof and a lid that hermetically seals the opening of said hollow portion, a plurality of three-dimensional electrodes formed of at least four electrically conductive coatings that are arranged in equally spaced relationship with each other on inner peripheral wall surfaces of said hollow portion and a conductive metal sphere that is freely movably received in said hollow portion and comes into contact with two adjoining electrodes of said electrodes to electrically interconnect both of the two adjoining electrodes, said case body being formed of a laminated structure constituted by vertically laminating and hermetically sealing a plurality of sheets that are individually made from low thermal expansion glass having a high gas barrier property and a high heat resistance property, and co firing the laminates at a low temperature, wherein when said case is tilted or vibrated, said conductive metal sphere is caused to move in said hollow portion so that the sensor is turned on/off by the moving displacement thereof, wherein:
the conductive metal sphere comprises a spherical body without plating that is formed from hard gold alloy;
the lid is formed of a low thermal expansion glass having a high gas-barrier property and a high heat resistance so that a motion of the conductive metal sphere in the hollow portion of said case body may be checked from the outside of said case through the glass lid with eyes;
planar conductive coatings are formed on a bottom surface of the hollow portion of the case body and a lower surface of the lid as means for preventing and/or removing a static electricity charge of the conductive metal sphere;
any impurities, such as moisture and fine dust, which adversely affect the on/off operation by the moving displacement of the conductive sphere, are removed from the hollow portion; and
a gas having a high electrical insulation property is included in said hollow portion under the state in which it is depressurized at least to a predetermined degree of vacuum.

11. The compact tilt and vibration sensor according to claim 10, wherein the conductive coating disposed on the bottom surface of the hollow portion of the case body is configured to be able to function as a common electrode.

12. The compact tilt and vibration sensor according to claim 10, wherein the case body is a rectangular parallel pipe that is integrally formed of a super engineering plastic as a base material having high heat resistance without heat distortion in a reflow process in STM (surface mount technology) and an excellent gas barrier property that enables blocking the transmission of moisture, outgas, and the like, instead of the ceramics or the low temperature expansion glass, by injection molding or high temperature compression and sintering molding.

13. The compact tilt and vibration sensor according to claim 10, wherein the hollow portion is formed as a square hole having a cross section of a generally square shape, and has four peripheral wall surfaces that are individually provided with a conductive coating formed thereon as separated electrode.

14. The compact tilt and vibration sensor according to claim 10, further comprising flat connecting terminals provided on a lower surface of the bottom of the case body, the terminal being formed of a conductive coating and individually and electrically connected to each of the electrodes.

15. The compact tilt and vibration sensor according to claim 10, wherein the case body and the lid are bonded to each other using a sealing glass.

16. The compact tilt and vibration sensor according to claim 10, wherein the conductive coating is formed as a thin film using a film deposition technique, such as thin film deposition, coating, vacuum deposition, sputtering, and ion plating.

17. A method for manufacturing a compact tilt and vibration sensor, the method comprising:
a step of forming a plurality of case bodies in a laminated structure which comprises a plurality of ceramics sheets vertically laminated and co fired at a low temperature, each of said case bodies having a hollow portion that is open at the top and has electrodes formed of a plurality of conductive coatings arranged therein and flat connecting terminals formed of a plurality of conductive coatings on a lower surface of the bottom of the case body that are individually and electrically connected to the electrodes;
a step of forming conductive metal spheres of hard gold alloy and freely movably accommodating said spheres into the hollow portions of said case bodies;
a step of forming a planar conductive coating on a bottom surface of each hollow portion as a means for preventing and/or removing a static electricity charge of the conductive metal sphere;
a step of hermetically sealing the upper openings of said hollow portions by means of a low temperature expansion glass sheet having a high gas barrier property and a high heat resistance that forms a lid of said case bodies,
a step of, simultaneously with the sealing step, removing moisture and impurities, such as fine dust, which adversely affect the on/off operation by the operation by the moving displacement of the conductive metal sphere from the hollow portion of each case body, and also enclosing a gas that has high electrical insulation property and is depressurized at least to a predetermined degree of vacuum in the hollow portion; and
a step of cutting the glass lid and the laminated ceramics sheets along crisscrossed dicing lines provided on the glass lid to obtain sensors as individual assemblies.

18. The method for manufacturing a compact tilt and vibration sensor according to claim 17, wherein the ceramic sheets included in the case body and the low temperature expansion glass sheet included in the lid are individually formed in a rectangular shape.

* * * * *